Aug. 26, 1930.   F. R. FAGEOL   1,773,979
WHEEL MOUNTING FOR VEHICLES
Filed Oct. 25, 1928   3 Sheets-Sheet 1

INVENTOR
FRANK R. FAGEOL
BY
ATTORNEY

Aug. 26, 1930.    F. R. FAGEOL    1,773,979
WHEEL MOUNTING FOR VEHICLES
Filed Oct. 25, 1928    3 Sheets-Sheet 2

INVENTOR.
FRANK R. FAGEOL
BY
ATTORNEY

Aug. 26, 1930. F. R. FAGEOL 1,773,979
WHEEL MOUNTING FOR VEHICLES
Filed Oct. 25, 1928 3 Sheets-Sheet 3

INVENTOR
FRANK R. FAGEOL
BY
ATTORNEY

Patented Aug. 26, 1930

1,773,979

UNITED STATES PATENT OFFICE

FRANK R. FAGEOL, OF OAKLAND, CALIFORNIA, ASSIGNOR TO TWIN COACH COMPANY, A CORPORATION OF DELAWARE

WHEEL MOUNTING FOR VEHICLES

Application filed October 25, 1928. Serial No. 315,002.

The present invention relates to wheel mountings for motor vehicles and has for an object to provide an improved construction adapted particularly for heavy vehicles such as trucks, motor buses, etc., although the invention is not limited to such application.

A specific object of the invention is to provide a mounting for drop axles, that is, for vehicles whose main or fixed axles are dropped below the plane of the live or wheel axles. The new construction is particularly adapted for use on vehicles on which the wheels are driven directly by separate power units and in which a differential is dispensed with. Such a vehicle is shown in my copending application Serial No. 191,216, filed May 13, 1927 and the present application is a continuation in part of said copending application.

Accessibility is of highest importance in dealing with motor vehicles and particularly large, heavy motor vehicles and it is therefore an object of the present invention to so arrange the parts that they may be reached or removed with a minimum of effort for repairs or adjustment.

Another object of the invention is to provide a heavy compact structure in which a housing for the wheel axle is formed with a spring pad to support a main spring of the vehicle.

Another object is to provide a structure in which the drive shaft for the wheel is journaled between the wheel and the spring pad.

Another object is to provide a wheel mounting and drive in which the wheel axle and the driving gear therefor are enclosed in a single housing adapted to contain lubricant so that there is a common lubricating system for the axle of the driving gear.

Another object of the invention is to provide a wheel and brake mounting in which a brake drum is detachably secured to a hub flange at the outer end of the wheel axle so that it may readily be removed when desired.

With these and other objects in view, which will appear hereinafter, I shall now describe a specific embodiment of my invention in connection with the accompanying drawings forming a part of this application.

In the drawings, Fig. 1 is a view in longitudinal section of my improved wheel mounting, the section being taken on the irregular line 1—1 of Fig. 2;

Figure 1:
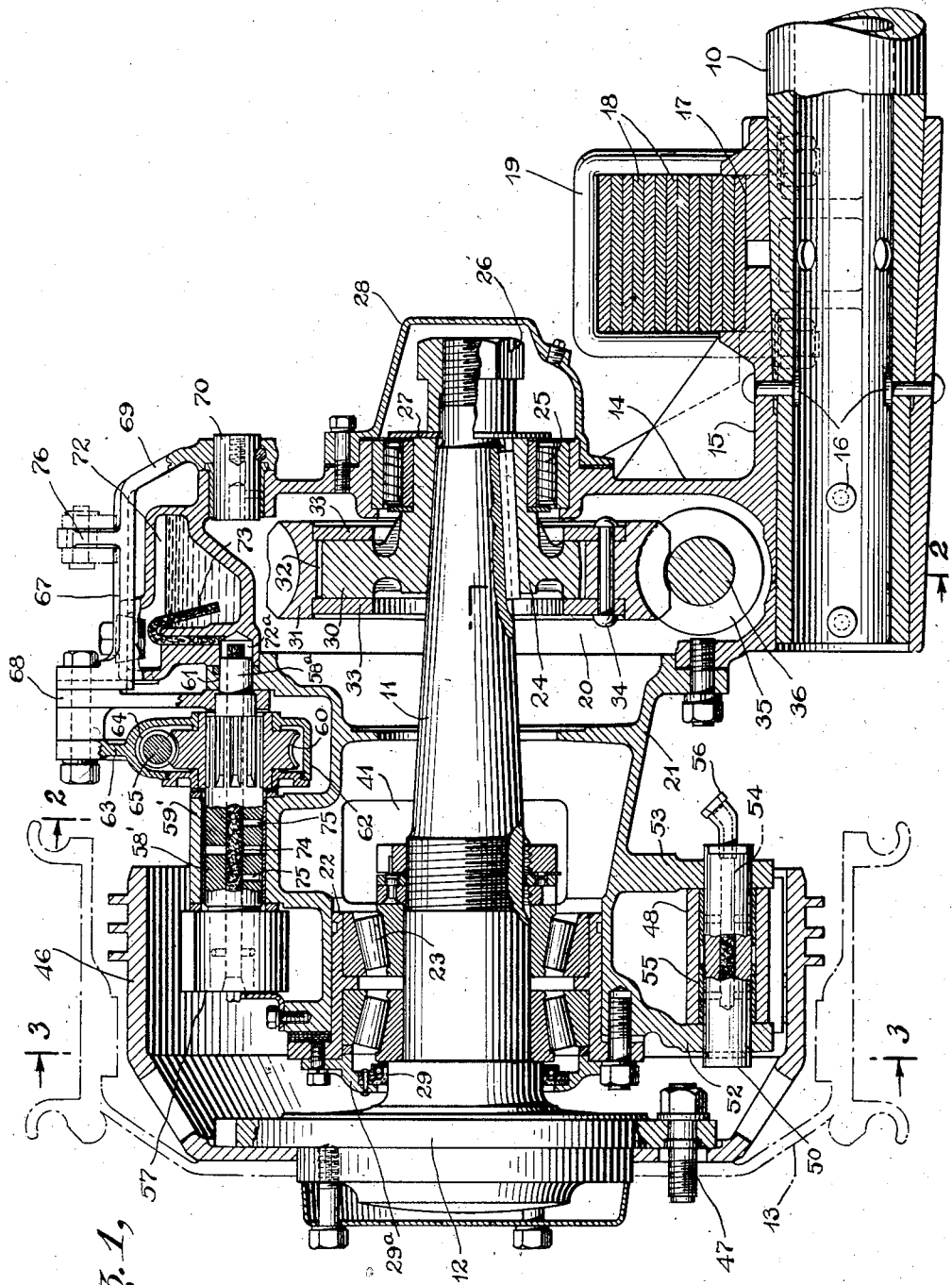

Referring particularly to Fig. 1, I have shown at 10 a portion of a fixed axle of a vehicle while vertically offset with respect to the fixed axle 10 is a live axle 11. The latter is provided at its outer end with a hub flange 12 to which is secured a wheel indicated by broken lines at 13 in Fig. 1.

It will be observed that the fixed axle 10 is of tubular form and is slightly tapered at its outer end. A bracket 14 is provided with a tapered sleeve portion 15 which fits snugly on the tapered end of the axle 10 and is secured thereon by means of rivets 16. A spring pad 17 is formed on the sleeve 15 and supports the leaves 18 of a vehicle spring, said leaves being clamped to the pad by means of U-bolts 19.

The bracket 14 which rises from the sleeve 15 is formed with a recess 20 to receive the driving mechanism for the live axle 11, and to the mouth of the recess 20 is secured an outwardly projecting housing member 21. In the outer end of this housing is secured a journal box 22 in which are fitted roller bearings 23 to support the outer end of the live axle. The inner end of the live axle which is tapered, fits into a spider or hub member 24 and is keyed thereto. The hub member, in turn, is journaled in roller bearings 25 carried by the bracket 14. The end of the live axle projects through the hub member 24 and is threaded to receive a nut 26 which bears against a washer 27 and the latter in turn bears against the end of the hub member 24. Thus, by screwing up the nut 26, the tapered live axle is drawn snugly into the tapered bore of the hub member 24. A hub cap 28 is fitted over the nut 26 and is secured to the bracket 14, thereby sealing the rear end of the housing, while the opposite end of the housing is sealed by means of a flexible washer 29 bearing against the live axle and carried by an annulus 29ª.

Figure 2:
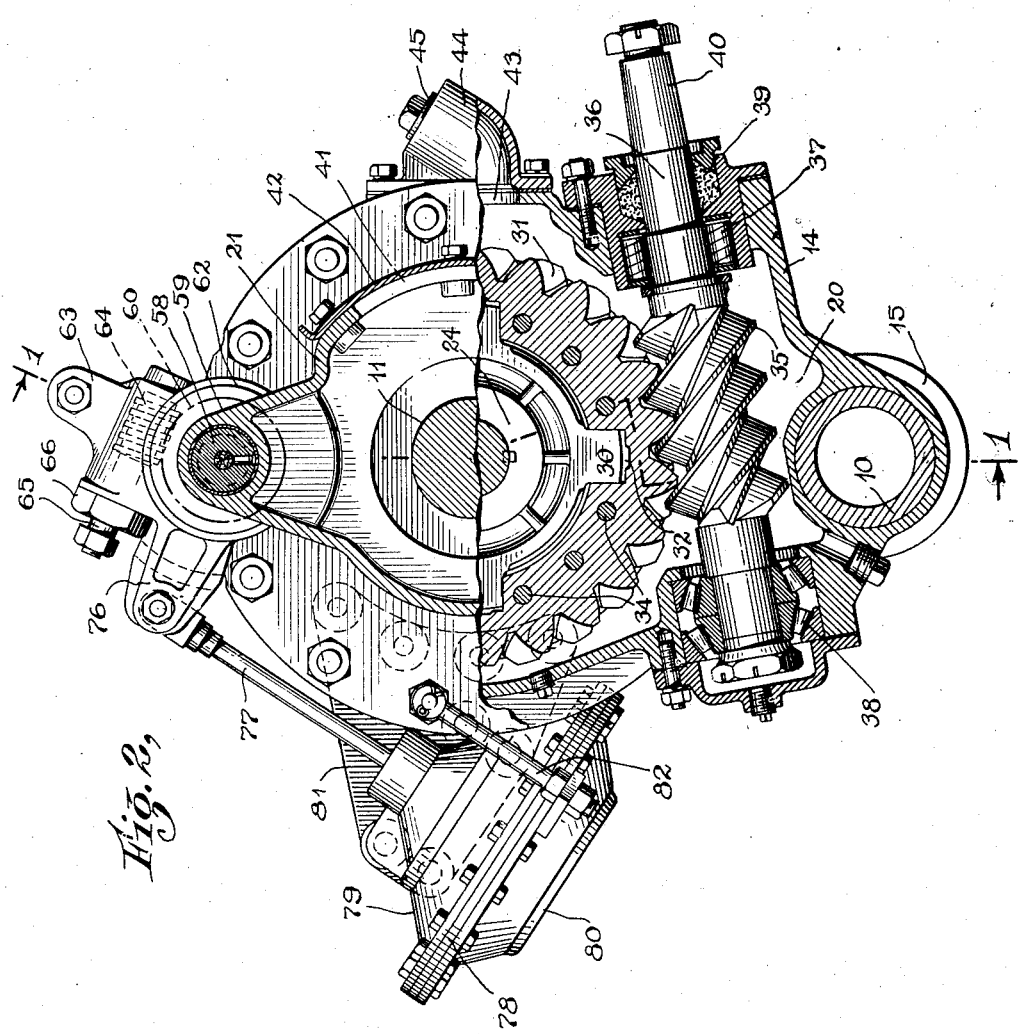
Fig. 2 is a view in transverse section taken on the irregular line 2—2 of Fig. 1.

The hub member 24 is formed with peripheral projections or lugs 30, as best shown in Fig. 2, and fitted upon this hub member is a spiral gear 31, the latter being formed with recesses 32 to receive the lugs 30. Clamping plates 33 on opposite sides of the hub member are secured to the spiral gear by means of rivets 34, thereby clamping the gear to the hub member. The spiral gear is driven by a worm 35 in the recess 20. The worm 35 is formed on a drive shaft 36 which is journaled in bearings 37 and 38, located respectively at opposite sides of the recess 20. The bearing 38 supports the outer end of the shaft and is designed to take the thrust of the worm. The opposite end of the shaft passes out of the recess 20 through a packing box 39 and is provided with a tapered end portion 40 by which it may be connected to a propeller shaft running from a suitable source of power.

In the side of the housing member 21, there is an opening 41 to provide access to interior parts. This opening is normally closed by means of a plate 42, as shown in Fig. 2. At one side of the bracket member 14, there is a port 43 opening into the recess 20, and a spout member 44 is bolted to the bracket 14 in registry with port 43. A plug 45 normally closes the spout. Through this spout lubricant is admitted into the housing where it serves not only to lubricate the worm and spiral gear but also to lubricate the bearings for the drive shaft and for the live axle.

Clamped between the wheel 13 and the hub flange 12 is a brake drum 46. Double ended bolts 47 are used to fasten the wheel to the hub flange, so that whenever it is desired to remove the brake drum, it is merely necessary to undo the nuts on the outer ends of the bolts 47 and then remove the wheel; whereupon the brake drum 46 will be free to be removed.

Figure 3:
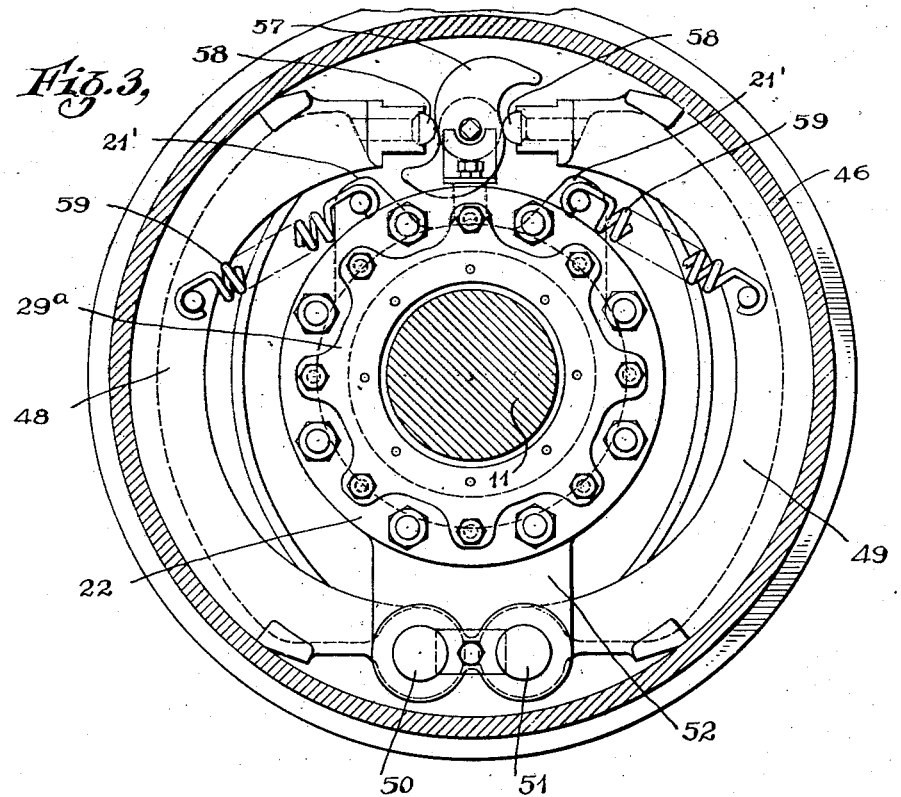
Fig. 3 is a view in transverse section showing the brake mechanism, the section being taken substantially on the line 3—3 of Fig. 1.
Figure 4:
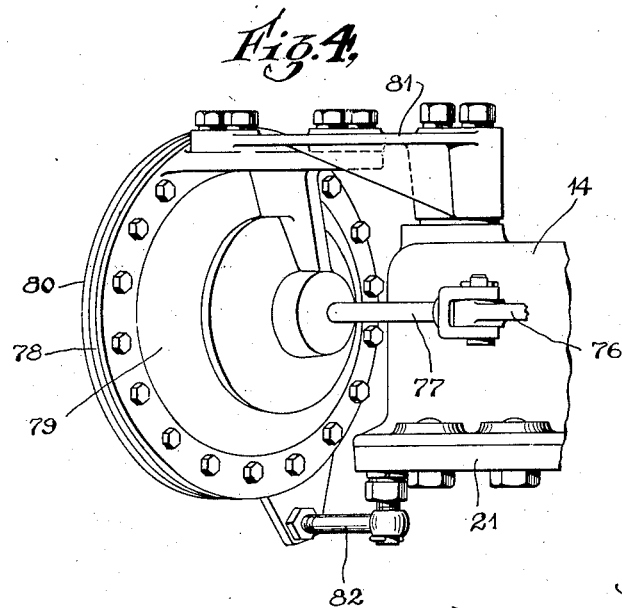
Fig. 4 is a fragmentary plan view of the hydraulic means for applying the brakes of the vehicle.

Within the brake drum and carried by the housing member 21, are a pair of brake shoes 48 and 49 which are pivoted at their lower ends upon pins 50 and 51 respectively (see Fig. 3), secured in bracket extensions 52 and 53 depending from the housing member 21. The pins 50 and 51 are each centrally bored as indicated at 54 to admit oil or grease therein and from this central bore extend radial bores leading to a bushing 55 in the pivot bore of the brake shoe. A grease cup 56 is provided at the inner end of each pin through which lubricant may be forced into the bore 54 and thence finds its way to the bushing 55. At their upper ends the brake shoes bear against a cam member 57, each shoe being provided with a hardened ball end 58 to take the wear against the cam member. Springs 59 connect the shoes respectively to brackets 21' carried by the housing member 21. These springs serve to press the shoes inward against the cam member 57 and clear of the brake drum 46. When the cam member 57 is turned, the brake shoes are forced outward into braking engagement with the drum 46.

The cam member 57 is mounted on the outer end of a shaft 58' which is journaled in a bearing member 59' integral with but exterior to the housing 21. Near its opposite or inner end, the shaft is splined to receive a worm wheel 60' and an extension 58ª of the shaft is supported in a bearing 61 formed in the housing 21. A casing 62 surrounds the worm wheel 60 and is rotatably supported on the hub of said worm wheel. This casing is provided with a crank arm 63. Normally the casing is prevented from turning with respect to the worm wheel 60 by means of a worm 64 journaled therein and engaging the worm wheel 60. The shaft 65 on which the worm 64 is fixed projects from the casing and provides means for adjusting the casing and its crank arm 63 with respect to the worm wheel 60. A nut 66 threaded on said shaft provides means for clamping the casing at the desired position with respect to the worm wheel 60. The crank arm 63 provides means for operating the cam 57 to throw the brake shoes out against the brake drum.

The crank arm 63 is secured to a yoke shaped member 67, one arm 68 of the yoke being journaled upon the shaft extension 58ª, while the other arm 69 is secured to a pin 70 which is journaled in the bracket 14. The inner end of the pin 70 communicates with the recess 20 of the bracket and is provided with an oil duct through which oil from the interior of the housing may be fed to the bearing of the pin. The upper end of the bracket 14 is provided with an oil reservoir 72 from which a wick 73 leads to an oil pocket 72ª communicating with the bearing 61. The shaft 58' is centrally bored to receive a wick 74 which passes oil from the pocket 72ª through the shaft and thence by way of transverse bores 75 to the bearings 59'. The yoke member 67 is provided with the crank arm 76 which at its outer end has pivotal connection with one end of a connecting rod 77. The opposite end of the connecting rod is secured to a diaphragm 78 fitted between a pair of cup members 79 and 80. These cup members constitute a diaphragm housing which is supported on one side by a bracket 81 secured to the bracket 14 and on the opposite side by means of a stay rod 82 secured to the main housing 21.

It will be understood that the usual means are provided for admitting fluid to the diaphragm chamber to flex the diaphragm 78, thereby causing the yoke 67, by reason of its connection with the diaphragm, to oscillate on its bearings. The shaft 58 and with it the cam 57 may thus be turned, expanding the brake shoes 49 into braking contact with the brake drum 46.

It will be observed that the above described construction embodies simplicity and ruggedness. At the same time, the parts are readily accessible for repairs and adjustment. The main housing is formed of two parts, namely, the part 21 and the recessed bracket 14, so that they may be readily detached. The bracket member 14 is not only a support for the live axle but also carries a pad for the vehicle spring. The problem of lubrication is considerably simplified by providing a single housing for the live axle and the driving mechanism. The oil reservoir 72 keeps the yoke members 63 properly lubricated and also the cam shaft for the brake, while a charge of grease in the pins on which the brake shoes are mounted, will suffice for a long period.

Obviously various variations and alterations in construction and arrangements of parts may be made without departing from the spirit and scope of my invention as pointed out in the following claims:

I claim:

1. A wheel mounting for vehicles, comprising a fixed axle, a bracket secured thereon and having a recess in the outer face thereof above said axle, an outwardly extending housing member detachably secured to the bracket substantially in registry with said recess, a live axle journaled in the bracket and housing member and projecting from the outer end of the housing member, means for securing a wheel to the projecting end of the live axle, a drive shaft journaled in the bracket, and gearing in the bracket operatively connecting the drive shaft and the live axle.

2. A wheel mounting for vehicles, comprising a fixed axle, a bracket secured thereon and having a recess in the outer face thereof above said axle, an outwardly extending member detachably secured to the bracket and forming with said recess a housing chamber, a live axle journaled in said chamber and projecting from the outer end thereof, means for securing a wheel to the projecting end of the live axle, a drive shaft projecting into the housing, and means within the housing operatively connecting the drive shaft and the live axle.

3. A wheel mounting for vehicles, comprising a fixed axle, a bracket secured thereon and having a recess at the outer face thereof above said axle, an outwardly extending housing member detachably secured to the bracket and forming with said recess an oil chamber, a live axle vertically offset with respect to the fixed axle and journaled in the oil chamber, the live axle projecting from the outer end of the housing member, means for securing a wheel to said projecting end, a drive shaft projecting into the oil chamber and journaled therein, means within the oil chamber operatively connecting the drive shaft and the axis, and means for preventing escape of lubricant from the oil chamber at points where the live axle and the drive shaft issue therefrom.

4. A wheel mounting for vehicles, comprising a fixed axle, a bracket secured thereon and having a recess in the outer face thereof above said axle, an outwardly extending housing member detachably secured to the bracket substantially in registry with said recess, a live axle journaled in the housing member and the bracket and projecting from the outer end of the housing member, a worm gear fixed upon the live axle within said recess, a drive shaft projecting into said recess, and a worm on the drive shaft meshing with said worm gear.

5. A wheel mounting for vehicles, comprising a fixed axle, a bracket secured thereon and having a recess in the outer face thereof above said axle, an outwardly extending housing member detachably secured to the bracket substantially in registry with said recess, a live axle journaled in the housing member and the bracket and projecting from the outer end of the housing member, a worm gear fixed upon the live axle within said recess, a drive shaft projecting into said recess, and a worm on the drive shaft meshing with said worm gear, the mouth of said recess being of larger diameter than the worm gear.

6. A wheel mounting for vehicles, comprising a fixed axle, a bracket secured thereon and comprising a base and an upwardly extending cup member opening outwardly, a spring pad formed on said base at the inward side of the cup, an outwardly extending housing member detachably secured to the bracket in substantial registry with the cup, a live axle journaled in the housing member and in said cup, said axle projecting from the outer end of the housing, means for securing a wheel to said projecting end, a drive shaft projecting into said cup and journaled in the bracket and means within the cup operatively connecting the drive shaft and the live axle.

7. A wheel mounting for vehicles, comprising a fixed axle, a bracket secured thereon and having a recess in the outer face thereof above said axle, an outwardly extending housing member detachably secured to the bracket substantially in registry with said recess, a live axle journaled in the bracket and the housing member and projecting from the outer end of the housing member, means within the recess for driving said live axle, the projecting end of the live axle being formed with a hub flange, a brake drum secured to the hub flange, brake shoes pivotally secured to the housing, and means carried by the housing for moving said shoes into engagement with the drum.

8. A wheel mounting for vehicles, comprising a fixed axle, a bracket mounted on the fixed axle and providing an outwardly extending housing vertically offset with respect to the fixed axle, a live axle journaled in the bracket, a driving gear journaled in the bracket, and a driven gear meshing therewith and fixed upon the live axle, the housing being formed of two parts detachably joined along a transverse plane whereby on separating the parts the outer part of the housing with the live axle and the driven gear may be withdrawn bodily from the inner part.

9. A wheel mounting for vehicles, comprising a fixed axle, a bracket secured to and rising from the fixed axle, a live axle supported thereby in vertically offset position with respect to the fixed axle and extending outwardly from the bracket, means on the outward side of the bracket for driving the live axle, and means at the inward side of the bracket for supporting a vehicle spring.

10. A wheel mounting for vehicles, comprising a fixed axle, a bracket providing a housing secured thereto, a live axle journaled in said housing, a driving gear keyed to said axle, and separately journaled in said housing, a drive shaft carrying a gear meshing with said driving gear journaled in said housing, a flange on said live axle, a brake drum removably secured to said flange, a wheel removably secured to said flange, and brake mechanism supported externally on a readily removable portion of said housing for applying braking pressure to said drum.

11. A wheel mounting for vehicles, comprising a fixed axle, a bracket providing a housing secured thereto, a live axle journaled in said housing and provided with a flange on the outer end thereof, a driving gear on the inner end of said live axle, a drive shaft carrying a gear meshing with said driving gear journaled in said housing, a separately removable brake drum and wheel secured to said flange, and brake mechanism supported on a portion of said housing, adjacent said flange, said named portion of said housing being removable from the portion of said housing that is attached to said fixed axle whereby said wheel, brake drum and brake mechanism can be readily removed.

12. A wheel mounting for vehicles comprising a fixed axle, a bracket, secured to said fixed axle and providing a housing constructed in sections secured together in a maner so as to be capable of lateral separation, a live axle journaled in said housing, a brake drum removably secured to said live axle by means accessible from the outer end of said axle, a wheel removably secured to said live axle, and brake mechanism for cooperation with said drum carried by the outer of said sections, whereby said mechanism can be removed as a unit by removing said section.

In testimony whereof, I have signed this specification.

FRANK R. FAGEOL.